Oct. 4, 1955
J. A. BUVELOT
2,719,741
SLACK ADJUSTER
Filed June 16, 1951
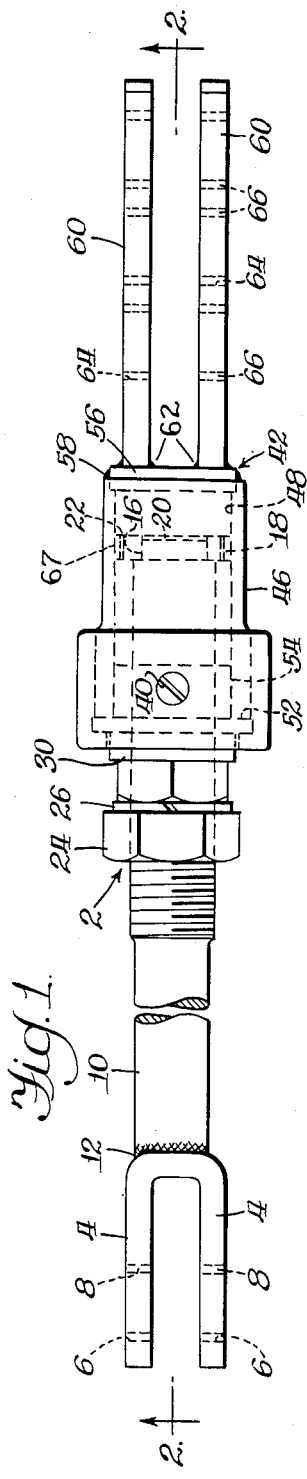
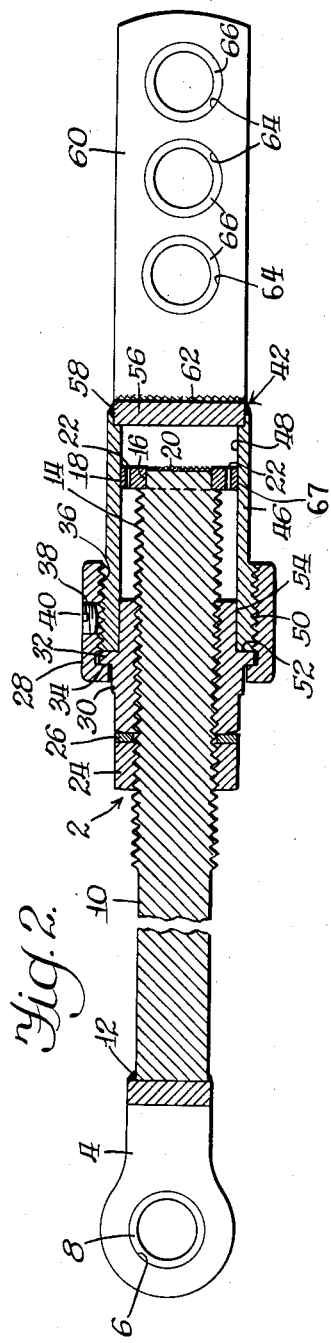
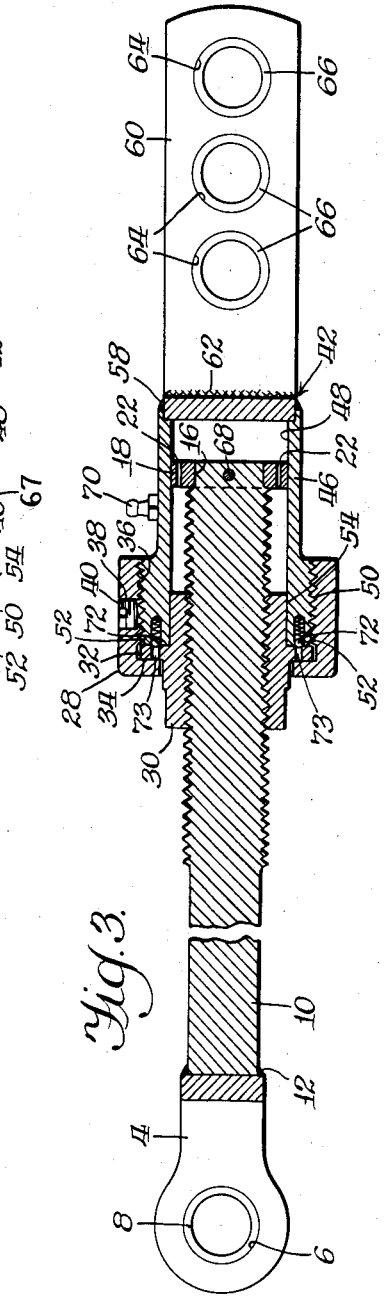
INVENTOR.
John A. Buvelot Patented Oct. 4, 1955

2,719,741

SLACK ADJUSTER

John A. Buvelot, Chicago, Ill., assignor to American Steel Foundries, Chicago, Ill., a corporation of New Jersey Application June 16, 1951, Serial No. 232,009

2 Claims. (Cl. 287—59)

My invention relates to an adjusting device for taking up the undesired slack in the foundation brake gear of railway cars, and more particularly relates to a manually operated, compressively and axially loaded, screw type slack adjuster to be integrated with the foundation brake gear of a railway car truck.

Railway car air brake equipment is in a condition of maximum efficiency when its foundation brake gear is free from excessive slack motion that cumulatively develops, primarily as a result of the wearing away of metal at the brake shoe friction surface.

For optimum effectiveness the travel of the brake cylinder piston should at all times be substantially that for which the brake system was designed and a periodic taking up of the undesired slack will restore the brake system to its optimum effectiveness. When worn shoes are replaced the slack adjusting device must be adjusted to provide a normal spacing of the brake shoe from the wheel tread.

The compressively and axially loaded type slack adjuster, with which my invention is concerned, must be designed to withstand the stresses that develop therein: upon the application of the braking force to the foundation brake gear, a reactionary force is necessarily applied thereto when the shoe comes into engagement with the wheel tread which subjects the slack adjusting device, as well as all other members of the foundation brake gear, to great stresses. In addition to direct compressive stresses the slack adjuster is also subjected to bending stresses owing to its slenderness and the slight inherent eccentricity of loading this may of itself cause failure, though the slack adjuster could withstand the direct compressive stresses. Such failure is commonly called "buckling," and may be likened to a column failure in which the resistance of the material to crushing is great, but failure of the column is attributed to bending alone.

Accordingly, the principal object of my invenion contemplates the provision of a compressively and axially loaded, manually operated, screw type slack adjuster that is rigid in design to resist flexure, thus preventing failure by "buckling."

Another object of my invention contemplates a slack adjuster that is inexpensive to manufacture—the component parts being readily fabricated by customary shop methods and from commonly available metal stock.

A further object of my invention contemplates a slack adjuster that is efficient in operation and requiring no maintenance.

A still further object of my invention contemplates a slack adjuster that is simple, compact, and sturdy in design.

My invention embodies other novel features, details of construction, and arrangement of parts which are hereinafter set forth in the specification and claims and illustrated in the accompanying drawings, wherein:

Figure 1 is a top plan view of my novel slack adjuster.

Figure 2 is a sectional view taken on the line 2—2 of Figure 1.

Figure 3 is a sectional view, similar to Figure 2, showing a modified form of my invention.

With reference to Figures 1 and 2, my novel slack adjuster comprises two concentric and close fitting telescoped subassemblies coupled together, one of which I have designated 2, and term a slack adjuster screw comprising a clevis 4 provided with spaced concentric holes 6—6 having bushings 8—8 pressed therein to provide a better wearing pivotal connection with a member (not shown) of the foundation brake gear. This connection to the brake gear renders the screw 2 nonrotatable when the adjuster is mounted in operative position in the brake gear. Slack adjuster screw 2 also includes a rod 10 having one end annularly welded to clevis 4, as at 12, and the other end threaded, for slack take up, as at 14. Adjacent thread 14 an end portion 16 of reduced diameter may be formed to facilitate connection of an aligning collar 18 pressed thereon and further secured by an annular weld, as at 20. Holes 22—22 are provided in collar 18 to accommodate the passage of lubrication therethrough. Before collar 18 is pressed onto rod 10, jam nut 24, lock washer 26, flanged coupling nut 28, and slack adjusting nut 30 are assembled on rod 10 in the order mentioned. An internal thread 36 is formed in coupling nut 28 for threaded engagement with thread 50 formed on housing 46. Slack adjusting nut 30 is provided with a flange or collar 32 formed thereon; one side of collar 32 is in annular coplanar abutment with coupling nut 28, as at 34, for drawing housing 46 onto slack adjusting nut 30 upon the threaded engagement of coupling nut 28 and housing 46. A threaded aperture 38 is formed on coupling nut 28 for the reception of a set screw 40 that secures coupling nut 28 upon housing 46. It should be noted that flange 32 on the adjusting nut 30, when the arrangement is assembled, is rotatably positioned between the inboard end of the housing 46 and the retaining flange formed on the coupling nut 28.

The other telescoped subassembly is designated 42 and comprises the hollow cylindrical housing 46 having a well-finished concentric hole 48 therethrough of uniform cross section. Housing 46 is sleeved onto a well-finished cylindrical surface 54 formed on slack adjusting nut 30 and seated in flat face movable rotatable abutment against annular bearing surface 52. Hole 48 is closed by a circular plate 56 annularly welded to housing 46, as at 58. A pair of spaced connecting plates 60—60 are welded to plate 56, as at 62—62, and provided with three pairs of spaced and concentric holes 64—64 having bushings 66—66 pressed therein to afford better wearing pivotal connections with a member (not shown) of the foundation brake gear. It will again be noted that when the plates 60 connect to the brake gear, the plates and the connected housing 46 are nonrotatable with the slack adjuster in mounted operating position in the brake arrangement. The threaded end of rod 10 is received within the hole 48 of housing 46, collar 18 having a well-finished cylindrical surface 67 in a close sliding fit with housing 46. In the assembly of my noval slack adjuster, housing 46 is to be packed with grease to effect the substantially frictionless adjustment of the slack adjuster.

My novel slack adjuster may be adjusted as follows: to take up the undesired slack, jam nut 24 must first be loosened and slack adjuster nut 30 then turned in a clockwise direction causing the threaded rod 10 to travel outwardly to take up the undesired slack. A greater resistance to bending may be obtained by spacing collar 18 close to plate 56; this can be effected by making a change in the pin connecting holes 64 during adjustment. After replacing a worn out shoe, slack adjuster nut 30 must be turned in a counterclockwise direction until the desired slack is obtained, then jam nut 24 is to be tightened.

The modified form of my invention, shown in Figure 3, is similar to the preceding embodiment—corresponding parts being identified by corresponding numerals. In this modified embodiment the differing construction is as follows: a pin 68 is utilized to secure collar 18 to rod 10; lubricating fitting 70 is applied to housing 46; and a spring actuated detent 72 is provided to complementally engage an aperture or depression 73 to more readily facilitate the adjustment of slack adjusting nut 30.

While my invention has been shown but in two forms, it is obvious to those skilled in this art that it is not so limited but is susceptible of various changes and modifications without departing from the spirit and scope of the claimed invention.

I claim:

1. In a telescoped slack adjuster assembly, a close fitting and coupling connection comprising a screw, a rotatable slack adjusting nut threadably mounted on the screw, said nut having a collar peripherally formed thereon intermediate the ends thereof, an aligning collar mounted on the end of the screw, a housing having a hollow bored chamber with a closed end and an open end, said housing being telescoped snugly over the aligning collar and a portion of said adjusting nut, screw threads on the outside peripheral surface of the housing, and a coupling nut threadably mounted on the screw threads on the housing, said coupling nut having a radially inwardly extending flange at one end thereof, said collar on the adjusting nut being rotatably positioned intermediate the flange on the coupling nut and the open end of the housing, whereby upon rotation of said slack adjusting nut the housing and screw are urged to move relative to each other.

2. In a slack adjuster assembly, a threaded rod having a clevis welded to one end thereof, a slack adjusting nut threadably mounted on said rod and rotatable relative thereto, an annular shoulder formed on the nut, a cylindrical surface formed on one end of said nut immediately adjacent said shoulder, an aligning collar connected to the other end of said rod, a housing sleeved onto said collar and said surface and having one end thereof positioned adjacent one side of said shoulder, a coupling nut threadably mounted on said end of the housing and having a flange thereon located adjacent the other side of said shoulder, said shoulder being movably disposed intermediate said flange and said end of the housing to accommodate rotation of the said adjusting nut, spaced connection plates welded to the other end of said housing, said plates and clevis having apertures for pin connections to a foundation brake gear whereby the screw and the housing are substantially nonrotatable relative to each other, said housing and screw being linearly moved relative to each other upon rotation of said adjusting nut.

References Cited in the file of this patent

UNITED STATES PATENTS

| Number | Name | Date |
|---|---|---|
| 897,676 | Thompson | Sept. 1, 1908 |
| 1,156,997 | Hayes | Oct. 19, 1915 |
| 1,683,516 | Adams | Sept. 4, 1928 |
| 1,934,910 | Buhr | Nov. 14, 1933 |
| 2,217,533 | Wolarsky | Oct. 8, 1940 |
| 2,341,394 | Sloan | Feb. 8, 1944 |
| 2,403,512 | Flesch | July 9, 1946 |